United States Patent
Herbert

(10) Patent No.: US 6,470,809 B1
(45) Date of Patent: Oct. 29, 2002

(54) ADJUSTABLE HOLDING DEVICE ON BOARD COMPUTERS IN MOTOR VEHICLES, ESPECIALLY FOR A LAPTOP OR A NOTEBOOK COMPUTER

(76) Inventor: Karl-Walter Herbert, Neue Strasse 30, D-91091 Grossenseebach (DE)

( * ) Notice: Subject to any disclaimer, the term of this patent is extended or adjusted under 35 U.S.C. 154(b) by 0 days.

(21) Appl. No.: 09/762,642

(22) PCT Filed: Apr. 29, 1999

(86) PCT No.: PCT/DE99/01268

§ 371 (c)(1),
(2), (4) Date: Feb. 9, 2001

(87) PCT Pub. No.: WO99/55554

PCT Pub. Date: Nov. 4, 1999

(30) Foreign Application Priority Data

Apr. 29, 1998 (DE) .......................................... 198 19 011
Jan. 21, 1999 (DE) .......................................... 199 02 583

(51) Int. Cl.[7] .............................................. A47B 23/00
(52) U.S. Cl. ........................................... 108/44; 108/42
(58) Field of Search .............................. 108/44, 45, 42, 108/43; 224/42.11, 42.42; 248/444.1

(56) References Cited

U.S. PATENT DOCUMENTS

| | | | |
|---|---|---|---|
| 3,282,566 A | * 11/1966 | Clarke | |
| 3,589,577 A | * 6/1971 | Basinger | |
| 3,698,330 A | * 10/1972 | Krombach | |
| 4,854,538 A | 8/1989 | Von Schalscha | |
| 4,909,159 A | * 3/1990 | Gonsoulin | |
| 5,390,609 A | * 2/1995 | McKee | 108/45 |
| 5,485,793 A | * 1/1996 | Crowell | 108/44 |
| 5,673,628 A | * 10/1997 | Boos | 108/44 |
| 5,769,369 A | * 6/1998 | Meinel | 108/45 X |
| 6,055,911 A | * 5/2000 | Krenzer | 108/44 |
| 6,145,447 A | * 11/2000 | Henderson | 108/44 |
| 6,315,252 B1 | * 11/2001 | Schultz | 108/45 X |

FOREIGN PATENT DOCUMENTS

| | | |
|---|---|---|
| DE | 42 39 697 | 6/1994 |
| DE | 44 21 039 | 9/1995 |
| DE | 195 10 339 | 9/1996 |
| DE | 297 08 702 | 7/1997 |
| WO | WO96/05081 | 2/1996 |

* cited by examiner

*Primary Examiner*—Jose V. Chen
(74) *Attorney, Agent, or Firm*—Collard & Roe, P.C.

(57) ABSTRACT

An adjustable holding device for on-board computers in motor vehicles, in particular for laptop or notebook computers consists of a support construction (h1) with a table plate (h2) located at its top end for demountably and remountably holding the on-board computer in the interior of the motor vehicle in the desired working position, and a floor-side spreading strut (23) at the lower end of the support construction (h1) for securing the support construction on support surfaces (A1, A2) in or near the floor region of the interior of the motor vehicle. The expanding strut (23) has two spreading levers (24, 25) connected by a lockable and releasable hinged joint (26), whereby the spreading strut (23) can be expanded by depressing the hinged joint and thereby adjusted to the length generating the required force of contact pressure. The stretched position (II) can be arrested by locking the hinged joint (26). For this purpose, provision is made for structure (27) for detachably mechanically connecting the first spreading lever (24), e.g. on its lever extension (24a), with the second spreading lever (25), the structure locking the hinged joint (26).

21 Claims, 7 Drawing Sheets

View prior to spread-in

Top view with view of interior

Base foot in spread-in condition (installed condition)

Adjustable in 4 states by displacing the pin

Pin at the same time serves as safety means against rotation

Basic Rail

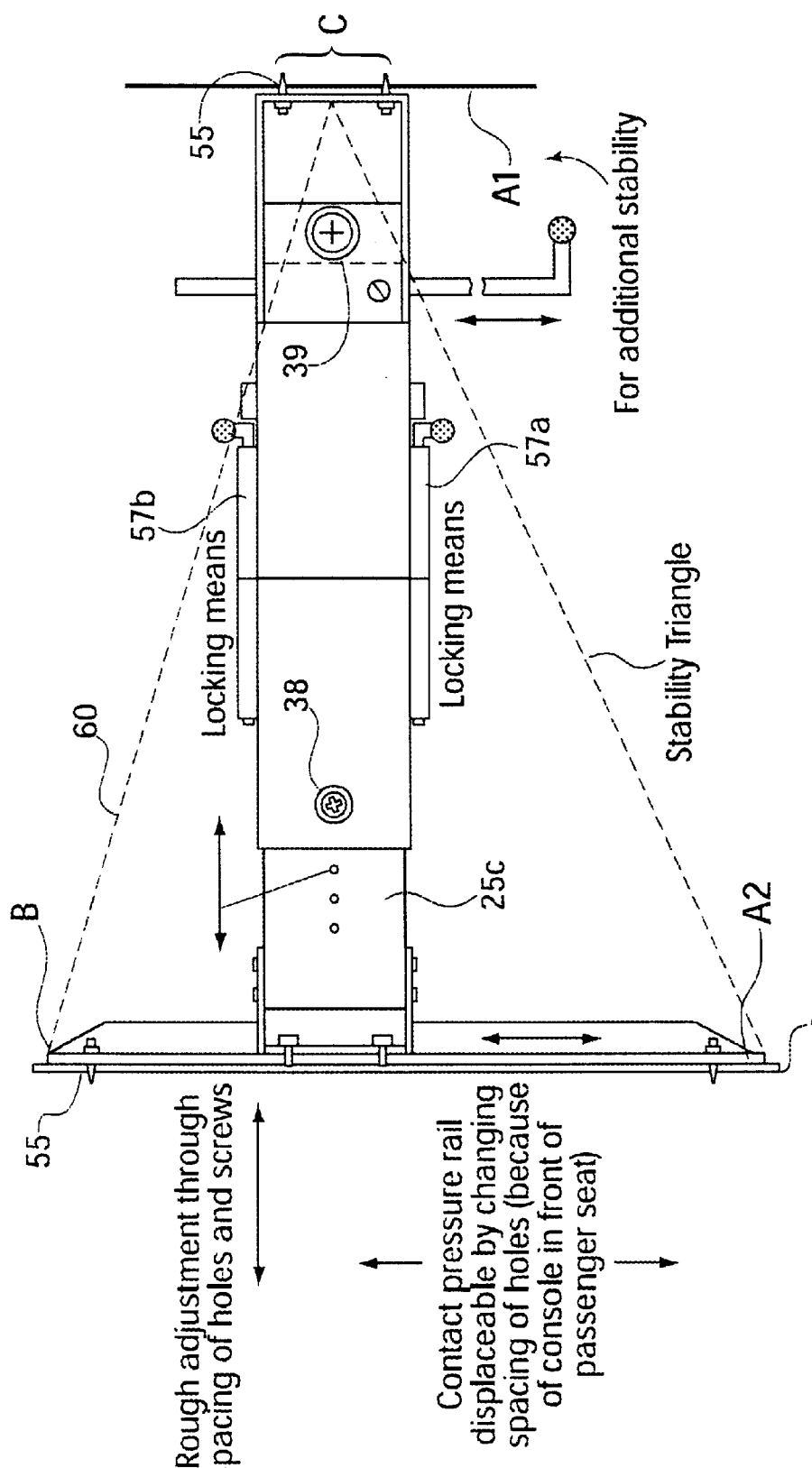

ADJUSTABLE HOLDING DEVICE ON BOARD COMPUTERS IN MOTOR VEHICLES, ESPECIALLY FOR A LAPTOP OR A NOTEBOOK COMPUTER

CROSS REFERENCE TO RELATED APPLICATIONS

Applicants claim priority under 35 U.S.C. §119 of German Application No. 198 19 011.5 filed Apr. 29, 1998. Applicants also claim priority under 35 U.S.C. §120 of PCT/DE99/01268 filed Apr. 29, 1999. The international application under PCT article 21(2) was not published in English.

DESCRIPTION

The invention relates to an adjustable holding device for on-board computers in motor vehicles, in particular for laptop or notebook computers, consisting of a support construction with a table plate located at the top end of said construction for demountably and remountably holding the on-board computer in the interior of the motor vehicle in the desired working position with respect to an occupant of the motor vehicle operating the on-board computer.

For adjusting the desired working position, the table plate is supported on the remaining support construction particularly in such a way that it can be adjusted sideways and with respect to its level of height and depth, and locked in the working position so selected in at least one preferred inclined position like a lectern.

The holding device furthermore comprises a fastening system on the lower end of the support construction for securing the latter on supporting surfaces in or near the floor region of the interior of the motor vehicle.

A holding system according to the features of claim 1 outlined above is known from DE-A1-44 21 039 [1] and DE design patent GM 297 08 702.9 [2]. According to said prior art, the support construction is designed in the form of a support arm or vertical tube with a lockable swivel arm on the top end, whereby a ball joint or inclining joint (which can be locked in position as well) for a table top or console holding the laptop or notebook computer is located on the outer end of the swivel arm. The vertical tube is fastened with its lower end on the wall of the driveshaft tunnel preferably in the position in front of the front-seat passenger, and partly also on the center console located above said driveshaft tunnel, and because of the inclined and curved or tapered way in which the wall of the driveshaft tunnel is extending, it can be adjusted with respect to its alignment by means of the fastening system. Drilling holes into the wall of the driveshaft tunnel for screws for anchoring the vertical tube is not deemed desirable in many cases because this will leave visible marks after the holding device has been removed. When the vehicle is sold as a used car, such marks represent to the potential buyer an additional depreciation of the vehicle's value if such a buyer cannot himself use the drilled holes in the tunnel wall for mounting his or her own computer holding device, or simply does not want them.

In connection with another known holding device for on-board computers according to EP-A1-0 182 413 [3], a foot-side support for anchoring the support construction on the bottom side is screwed to the floor of the vehicle, for which purpose holes are drilled into the floor of the vehicle.

With respect to the holding devices according to [1] to [3] mentioned above, it is necessary to take into account, furthermore, that a large group of customers for on-board computers and their holding devices are field service employees, whose motor vehicles are often leased automobiles. Such motor vehicles have to be returned with as little damage as possible once a lease contract has expired, so it is impossible to drill holes into the wall of the driveshaft tunnel or floor of the vehicle.

Furthermore, a holding device with a pivotable and vertically adjustable support construction for a laptop or the like in a passenger car is known from DE-A1-195 10 339 [4]. Here, a clamped console is clamped in the foot space of the front-seat passenger in such a way that the pivoting laptop support can be reached by both the front-seat passenger and the driver. With this known holding device according to [4], no holes need to be drilled in support walls of the vehicle; however, because of its gear mechanisms for four extendable support legs and the stable housing, this clamped console is relatively heavy and, therefore, subjected to increased forces due to mass occurring during acceleration and braking of the vehicle, so that increased requirements have to be satisfied with respect to the bottom-side clamping of the clamped console. Now, the two pairs of support legs, which are supported on both sides of the clamped console where they can be extended and retracted, are provided on their free ends with round support dishes having a relatively small diameter. Said support dishes, however, because of their small friction grip surfaces, cannot prevent the clamping from getting loose, or the clamped console from getting skewed in spite of their skid-proof coating, especially not during hard braking of the vehicle, all the less so in light of the fact that the support construction is clamped "rigidly" by means of quick-action clamping devices, and that this type of clamping involves a four-point clamping system that can be statically controlled only with difficulty. It comes as no surprise that such a holding device with a clamped console has not yet appeared in the market for passenger car accessories.

The invention is based on the problem of avoiding the problems outlined above and to equip an adjustable holding device for on-board computers in motor vehicles with a fastening system of such a type that no drilling and screwing to the wall of the driveshaft tunnel or bottom metal sheet of the vehicle is required for mounting the support construction, on the one hand, and that operationally safe fastening in a passenger car (or also in a truck) is made possible by a specially designed clamping system, on the other hand, such a fastening arrangement retaining its position in the presence of any occurring acceleration and braking forces.

A further problem is to develop the basic concept of the holding device with its fastening system in such a way that it is possible to easily and quickly adapt it to support surfaces in the motor vehicle that differ with respect to their directions and spacings, i.e., to allow it to be adapted to differently shaped and spaced support surfaces of the driveshaft tunnel and door sills.

According to another problem, the holding device as defined by the invention is to be suited for quick installation and quick removal, which is understood to mean that it is to be mountable or removable in less than 60 seconds.

According to yet another problem, the constructional setup of the fastening system for the holding device is to permit a lightweight construction, so that during acceleration or braking of the motor vehicle, the inertia forces to which the fastening system is subjected to will be relatively low.

Now, the object of the invention is an adjustable holding device for on-board computers in motor vehicles, in particular for laptop or notebook computers, consisting of a support construction with a table top plate at its upper end for demountably and remountably holding the on-board computer in the interior of the motor vehicle in the desired working position with respect to a vehicle occupant operating the on-board computer; and, furthermore, a fastening system on the lower end of the support construction for mounting the support construction on support surfaces within or near the floor region of the interior of the vehicle, whereby the fastening system is a clamping system with at least one clamping strut, which can be clamped on support surfaces of the interior of the vehicle opposing each other with a spacing and extending at least approximately perpendicular to the floor of the vehicle; and whereby the clamping strut is provided for said purpose on each of its two ends with a contact-pressure element arrangement, and the contact-pressure elements are provided for said purpose with outer counter support surfaces for pressingly abutting the support surfaces, and the clamping system is provided with means for contact pressure-generating enlargement of the spacing of the contact-pressure elements relative to each other during installation, or for contact pressure-reducing reduction of the spacing of the contact-pressure elements relative to each other during removal of the clamping system, as stated in the introductory part of claim 1.

In connection with such a holding device, the invention according to the characteristic part of claim 1 for solving the problem posed consists in that the clamping system is a spreading system, and the clamping strut is a spreading strut having at least two spreading levers connected by a lockable and releasable hinged joint, of which at least one lever can be pre-adjusted with respect to its length in such a way that the spreading strut can be brought into a bent-in ready position, with its contact-pressure elements spaced from the associated support surfaces, and the spreading strut can be stretched to a length by means of depressing the hinged joint that will generate the required contact pressure force, whereby the stretched and mounted spreading strut can be fixed in its expanded position by locking the hinged joint.

Advantageous further developments are specified in the dependent claims 2 to 21.

The advantages achievable with the invention are mainly to be seen in that a very short time span is required for mounting and removing the holding device with its fastening system. Furthermore, no tools are required for installing and removing the device (a wrench or a spindle drive motor would be required with a worm gear, which means additional expenditure).

Such a spreading system also may be, for example a scissors-type lever system, whose scissors arms are pivot-jointed with each other, whereby the scissors arms form a rhombic framework, or several rhombic frameworks one following the other in the direction of expansion. When such frameworks are flattened, the length of the scissors-type lever system is increased, or, vice versa, reduced if the joints of the rhombic frameworks opposing each other move farther apart from each other. It is preferably possible also to employ pneumatic (and, if need be, hydraulic) piston-cylinder systems with small manual pumps for changing the length of the expanding strut or scissors lever system, whereby the position of the piston is usefully secured by a releasable locking pawl engaging the locking teeth of a toothed rack when the holding system is in the spread, clamped position.

Additional advantages achievable with the invention, among others, are to be seen in that the holding device can be quickly installed by means of screwless quick expansion (which means screw holes are avoided), and also removed again by quickly detaching the spreading system. The expansion system can be adapted-to different spacings between the support surfaces opposing each other in the interior of the vehicle, and it can be used also with support surfaces extending slanted, curved or in some other oblique way in relation to the longitudinal axis of the spreading strut, as it is the case, for example in connection with the walls of drivetrain tunnels. Within the meaning of the invention, such drivetrain tunnel walls still extend "approximately vertical", i.e. even if the tangent applied to the support surface and a vertical longitudinal plane jointly enclose an angle of about up to 25 degrees. It is shown below in detail that fastening through expansion is reliably possible even in such a case. A further advantage consists in that the holding device with its spreading system can be mounted in a normal (four-or five-seat) passenger motor vehicle in several basic positions: in front of the front passenger seat or in front of the left or right half of the rear seat bench, so that the on-board computer can be operated by the driver (which is the most frequent case) or by an occupant sitting in the back of the vehicle. In connection with motor vehicles with a cardan drive shaft, it is possible according to another feature of the invention to clamp the expanding system with its contact-pressure elements between support surfaces in the region of the door sill, on the one side, and support surfaces in the region of the cardan shaft, on the other. But the spreading system as defined by the invention can be installed also in motor vehicles without a cardan-type drive shaft (vehicles with front drive, or with a rear engine): either other center support surfaces are present instead of the wall of the cardan driveshaft tunnel, or the expanding system extends from one door sill up to the opposite door sill, in which case it has an extended spreading strut.

The following special advantages are pointed out in connection with the dependent claims 15 to 21:

Simplification of the locking of the hinged joint when the spreading strut is in its extended position, and simplified unlocking of the latter (in case of removal) without sacrificing the reliability of the lock.

Spring-elastic yielding of the spreading strut in its longitudinal direction is made possible with a simple construction.

Improved coupling of the floor-side fastening system or spreading strut with the support construction, in particular a vertical tube, so that the manual actuation for installing and removing the vertical tube is simplified, and defined clamping forces will always appear in this connection in the coupling site.

Variability of the working position of the on-board computer with respect to its level of height if desired by the user, by vertically adjusting the upright tube of the support construction having the table top plate holding the on-board computer supported at its top end.

The handling of the holding device is improved overall by said advantages. Because of the lever extension of the one spreading lever (see claim 15), the hinged joint can be locked at a relatively large spacing from said hinged lock, which provides a large moment for unlocking, and quick and comfortable locking and unlocking is made possible by actuating the knurled screw. Owing to the spring elements inserted between the two spreading levers, the spreading rail can be installed and removed in a very reliable manner without permitting excessive compulsive forces to occur, and tolerance compensation ensues in the mounted condition over the length of the spreading rail within the zone of the spring path, as well as a possibility for rating the contact pressure forces because of the selected spring force. The use of an eccentric lever-type clamping device for securing the coupling between the vertical tube and the base socket results in clamping forces acting on the coupling in a predefinable way, and such forces always remain the same even if the system is installed and removed several times, as well as in user friendliness in the sense of quick installation and removal.

The structure and the mode of operation of a holding device as defined by the invention, as well as further features of the invention are explained in greater detail in the following with the help of several exemplified embodiments shown in the drawing. The following is shown in the drawing by partly simplified schematic representations:

FIG. 11 is a plan view of the object according to FIG. 10.

Figure 1:
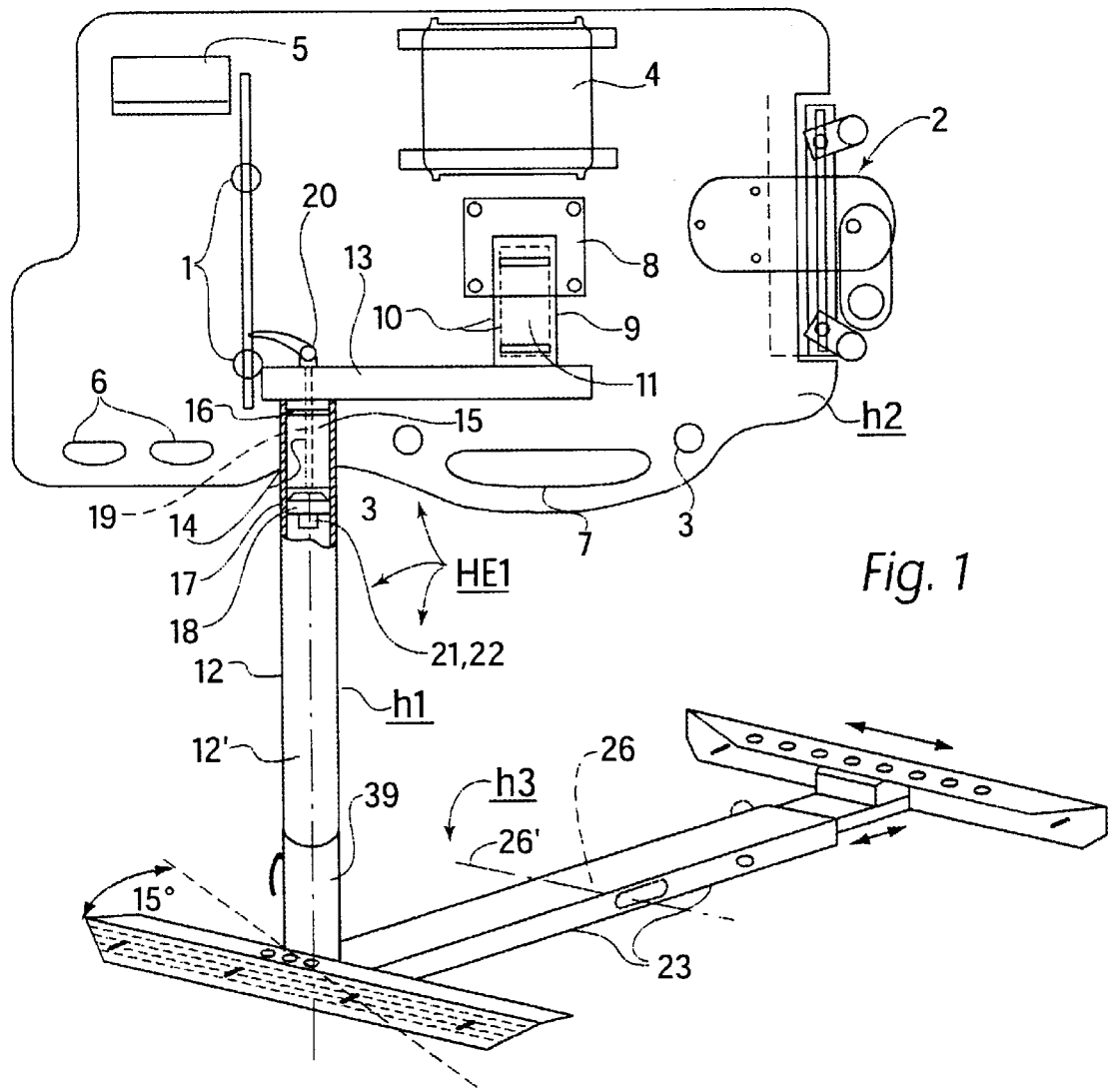
FIG. 1 shows a perspective overall view of a holding device as defined by the invention in the installed position, whereby the support surfaces on the cardan shaft tunnel and on the door sill of the associated motor vehicle are omitted for the sake of clarity.
Figure 2:
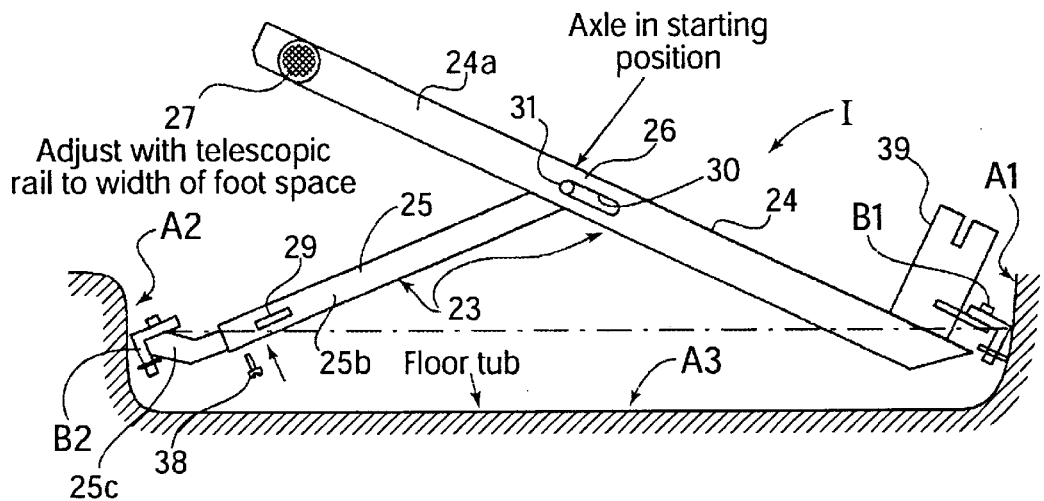
FIG. 2 shows an elevation of the detail of the floor-side spreading rail of the holding device according to FIG. 1, in a not yet stretched position shortly before the final installation or removal, positioned within the floor tub between the support surfaces on the door sill and on the cardan shaft tunnel.
Figure 3:
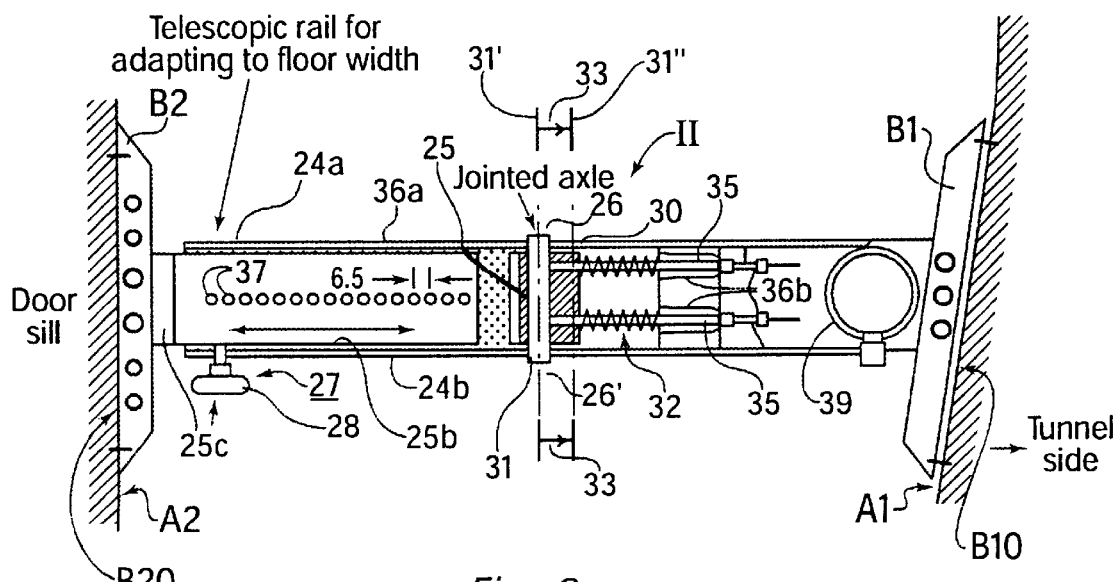
FIG. 3 shows by a top and partly sectional view the object according to FIG. 2 in its installed, stretched position.
Figure 4:
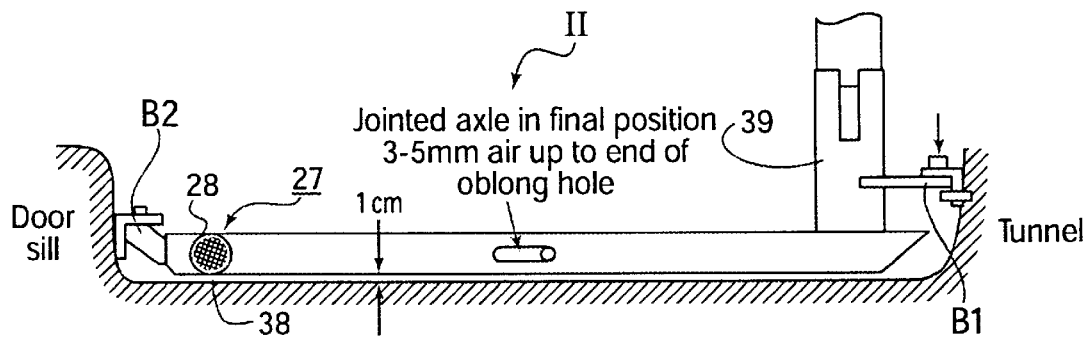
FIG. 4 shows by an elevation the installed stretched position of the spreading strut according to FIG. 3.

The adjustable holding device HE1 shown in FIG. 1 serves for holding an on-board computer (not shown) in a motor vehicle (also not shown), preferably in a passenger motor vehicle, of which only the contours of a floor tub in front of the front passenger seat are shown in FIGS. 2 to 4, such contours being required for understanding the invention. The on-board computer is preferably a laptop computer or a notebook computer because such computers can be supported and transported with less expenditure than normal table top computers because of their lighter, compact design. However, it is basically possible also to support normal table top computers if the holding device HE1 is provided with greater stability accordingly.

The holding device HE1 consists of a support construction hi with a table plate h2 at its upper end for demountably and remountably holding the on-board computer in the interior of a motor vehicle in the desired working position in relation to an occupant of the vehicle operating the on-board computer, and a fastening system h3 located at the lower end of the support construction h1 for securing the support construction of the support surfaces A1, A2 in or near the floor region A3 of a floor tub of the interior of the motor vehicle (see FIGS. 2 to 4).

The table plate h2 is shown in FIG. 1 by a "transparent" representation viewed from behind. The thicker lines belong to parts on the visible underside; the thinner lines to parts on the top side facing away from the viewer. It is to be noted that the side stop 1, which is fixed in the lateral direction, and the side stop 2, which is movable in the lateral direction, and, furthermore, the two fixed stops 3 serve for holding and fixing the on-board computer on the table plate h2. The following components are arranged or secured on the bottom side of the table plate h2: a power pack 4, a writing paper clip 5 with pen holder, two oblong recesses 6 disposed adjacent to each other for holding spectacles, a handle recess 7 in the region of the lower edge, and a small plate 8 screwed to the underside of the table plate in a shock-absorbing manner, with a tube socket 9 for a first adjustable swivel joint 10 being welded to said small plate 8. The swivel joint 10 is formed by the tube socket 9 and a cylindrical bearing body 11, which is inserted in said socket. The bearing body is secured on the swivel arm 13 and, on its outer circumference, has O-rings seated in annular grooves. With said O-rings, the bearing body is pushed into the tube socket 9 with press fit. In the present exemplified embodiment, the support construction h1 is designed in the form of a vertical tube 12. The swivel arm 13 is rotatably supported on the upper end of said vertical tube by means of a second, fixable swivel joint 14, rotating about the axle 12' of the vertical tube 12. For this purpose, a cylindrical bearing body 15 with the two O-rings 16, 17 on its outer circumference, said bearing body being screwed to the underside of the swivel arm 13, is pushed into the top end of the vertical tube 12. The lower O-ring 17, which is supported between the bearing body 15 and a pressure plate 18 in an annular groove expanding outwardly in the form of a "V", can be pressed or squeezed outwardly against the inner circumference of the vertical tube 12 by tightening the tie rod 19 engaging the pressure plate 18, which permits locking of the second swivel joint 14 after a desired angle of rotation has been adjusted for the swivel arm. The tie rod 19 penetrates the bearing body 15 and the swivel arm 13 in the axis of rotation of the swivel joint 14 and can be tensioned or relieved with an eccentric-lever clamping device 20 mounted on the head of the tie rod 19, whereby the degree of axial clamping can be preset by a nut with counter nut 21, 22 at the lower end of the tie rod 19.

The fastening system h3 is a spreading system with at least one spreading strut 23. In the present exemplified embodiment, the spreading strut 23 consists of two spreading levers 24, 25, which are connected with each other by means of a hinged joint 26 in the jointed shaft 26', and which can be clamped with the support surfaces A1 on the cardan shaft tunnel, said support surfaces opposing each other with a spacing and extending at least approximately perpendicular to the vehicle floor A3, and with the support surfaces A2 on the door sill of the interior of the vehicle (see also FIGS. 2 to 4 in the following). The spreading strut 23 or the two spreading levers 24, 25 are for this purpose provided on each of their two ends with a contact pressure element B1 and, respectively, B2, which have outer counter support surfaces B10 and, respectively, B20 for abutting the support surfaces A1, A2 under pressure.

As stated above, the spreading strut 23 has the two spreading levers 24, 25, which are connected by a lockable and releasable hinged joint 26. At least one (25) of said two spreading levers can be preset with respect to its length in such a way that the spreading strut 23 can be positioned in a bent ready-position I (FIG. 2) with its contact-pressure elements B1, B2 spaced from the associated support surfaces A1, A2, and the spreading strut 23 can then be stretched (see stretched position II in FIGS. 3 and 4) to the length generating the required contact pressure force by means of depressing the hinged joint 26, whereby the stretched and installed position II of the spreading strut 23 can then be arrested by locking the hinged joint 26.

A first (24) of the two spreading levers 24, 25 is provided with a lever extension 24a extending beyond the hinged joint 26. It can be seen that the length of said extension corresponds with a substantial part of the length of the second spreading lever 25 (preferably at least with half of the length of the spreading lever 25). In the stretched position II of the spreading strut 23 (FIGS. 3 and 4), the first spreading lever 24 with its lever extension 24a is flush with the second spreading lever 25. This abutting position is exploited for providing the means 27 for detachably mechanically connecting the lever extension 24a, preferably its end zone, with the second spreading lever 25, such means 27 forming a lock for locking the hinged joint 26. In the exemplified embodiment shown, the lever extension 24a, in the stretched position II of the spreading strut 23, grips over the second spreading lever 25. In the present embodiment, a favorable type of locking mechanism is a knurled screw 28 supported in a flank 24b of the lever extension 24a. In the aforementioned stretched position II, said knurled screw can be screwed into a deepening or recess 29 (see FIG. 2) of a side wall 25b of the second spreading lever 25, said side wall being located beneath the flank 24b.

The spreading strut 23 is designed yielding in its longitudinal direction with the elasticity of a spring. For this purpose, the hinged joint 26 of the two spreading levers 24, 25 is designed in the form of a pivot joint, with the oblong hole 30 of the pivot 31 of the one spreading lever 25 in side walls of the other spreading lever 24, whereby in the course of the stretching process of the spreading strut 23, the pivot 31 is movable in the oblong hole 30 against the force of the spring elements 32 inserted between the two spreading levers 24, 25, and the forces of contact pressure between the contact-pressure elements B1, B2 and their support surfaces A1, A2 can be limited due to the force of the spring elements 32, which are tensioned in this process, and it is possible, furthermore, to achieve compensation of tolerances with respect to the length of the spreading strut 23.

Figure 5:
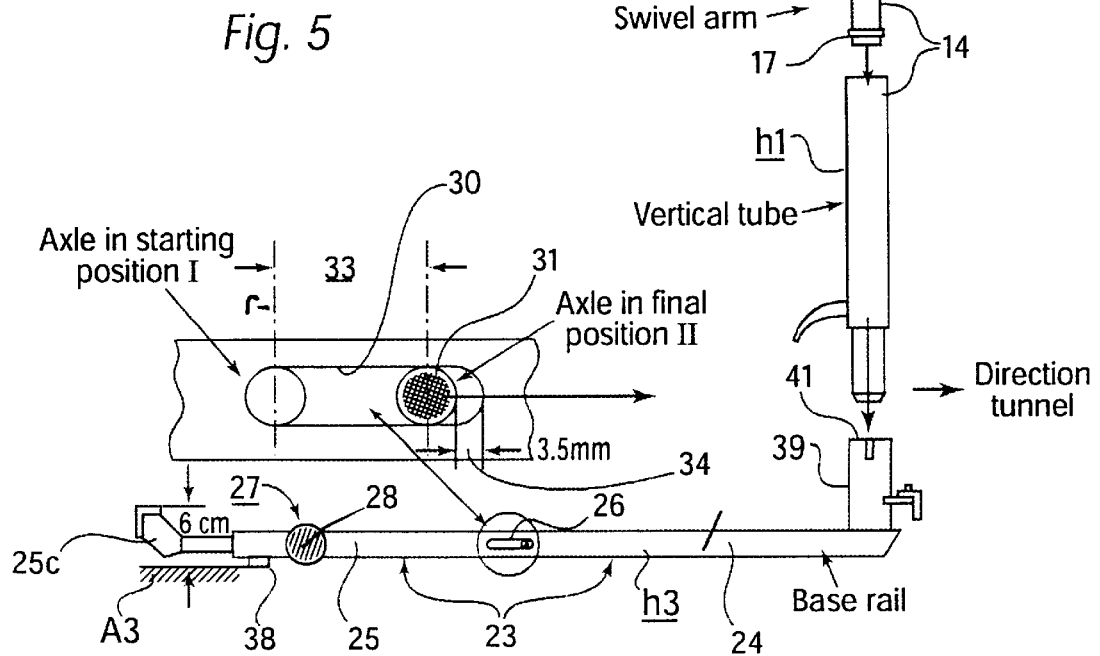
FIG. 5 shows the spreading rail in the position according to FIG. 4, supplemented by an enlarged representation of the spring path of its hinge pin, and supplemented by a schematic, separate representation of the vertical tube, the pivot arm and the table plate.

In the stretched, tensioned condition, the spreading strut 23 is slightly spaced from the floor A3, for example with a spacing of about 1 cm (see FIGS. 4 and 5). The lift of the pivot 31, which the latter is expected to execute between the position I and the stretched position II, is preferably dimensioned only in such a way that a clearance 34 of 3 to 5 mm will remain as a contact pressure reserve (see FIG. 5). FIG. 3 shows that-during the stretching movement of the spreading strut 23, when pressure is manually applied to its top side, the pivot 31 travels from the axle position 31' via the lift 33 into the axle position 31". In detail, the pivot 31 is secured in a block 36a, which is inserted in the inner end of the second spreading lever 25 in the rectangular section of the latter (FIG. 3). In addition, the guide bars 35 for the spring elements 32, the latter being designed in the form of coil pressure springs, are inserted in the block 36a as well. The guide bars 35 are guided in the longitudinal direction, or spring tensioning direction, in another block part 36b, which is secured within the rectangular section of the first spreading lever 24. The second spreading lever 25 is provided with an inner telescopic rail 25c, whereby it is possible to fix said telescopic rail in a more or less extended position by means of the row of holes 37 in the telescopic rail 25c and a step screw 38 supported in the spreading lever 25, said step screw being capable of engaging one of the holes of the row (37). This serves the purpose of a first adaptation with respect to length, whereby the fine adjustment is accomplished by the spring-elastically yielding coupling of the two spreading levers 24, 25 with the hinged joint 26.

FIGS. 1 to 5 show that a hollow cylindrical base socket 39 is fastened on one end of the spreading strut 23, i.e. on the outer end of (24), said socket being in an upright position when said strut is in its mounted position. The lower end of the vertical tube 12 can be coupled with said base socket by means of a plugged connection, and can be locked in the coupled condition and secured against rotation. The contact-pressure element B1 is secured on said base socket as well, whereas at the other end of the spreading rail 23, the contact-pressure element B2 is seated on the outer end of the telescopic rail 25c.

Figure 6:
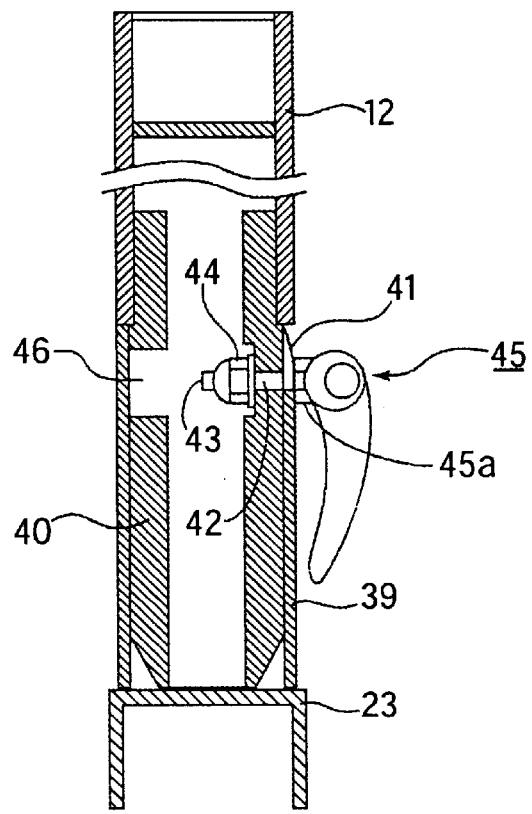
FIG. 6 is a detailed, enlarged elevation of the coupling between the lower end of the vertical tube and the base socket.

FIG. 6 shows the coupling site in detail. Accordingly, a tapered hollow-cylindrical plug extension 40 is secured on the lower end of the vertical tube 12 and can be plugged into the base socket 39. At its top end, the base socket 39 is provided with an edge slot 41 extending parallel with the axis. Furthermore, a radial clamping bolt 43 with a preset nut 44 is supported on its inner end in a wall passage bore 42 of the plug extension 40, said clamping bolt fitting into the edge slot 41 of the base socket 39 when the plug extension 40 is plugged in. An eccentric-lever clamping device 45 with a support rosette 45a is associated with the head of the clamping bolt 43Said clamping device 45 can be tensioned for locking the vertical tube 12, which is plugged in with its plug extension 40, and released for removing the vertical tube 12 from its plugged seating. Shown is the clamped position. The wall part of the plug extension 40 opposing the clamping bolt 43 is provided with a passage opening 46, which permits screwing tools, in particular socket wrenches to access the preset nut 44, which is preferably secured against rotation.

Figure 7:
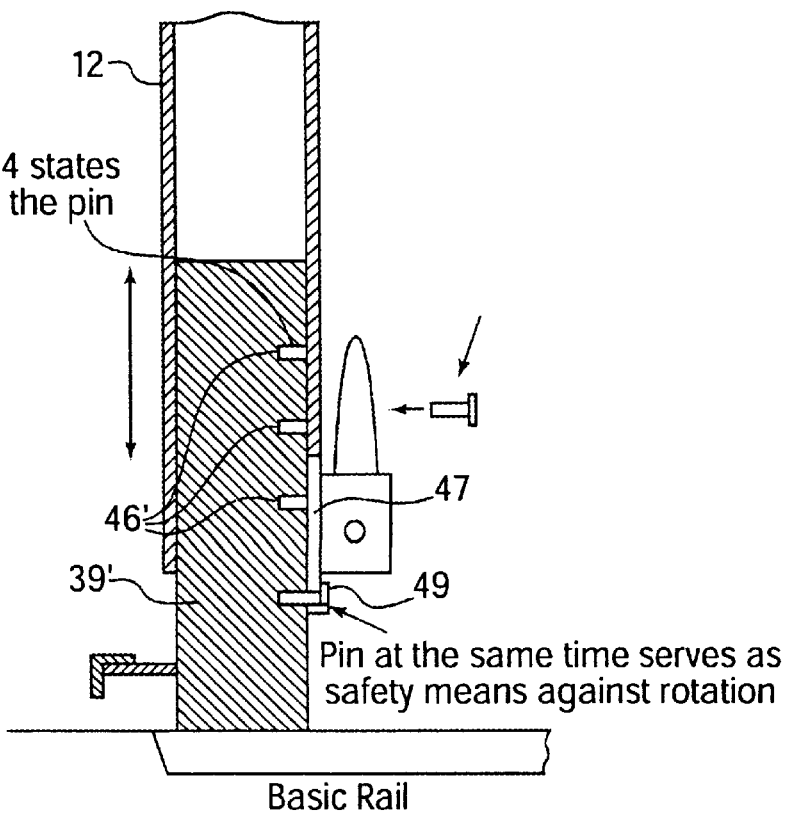
FIG. 7 shows by a corresponding view a vertically adjustable variation of the coupling according to FIG. 6.
Figure 9:
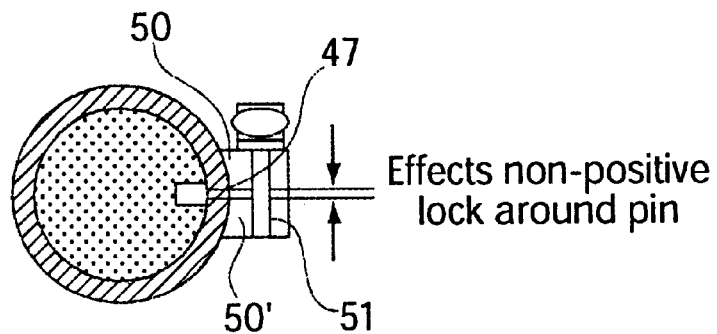
FIG. 9 shows the object according to FIGS. 7 and 8 partly by a cross sectional view and partly by a top view.
Figure 8:
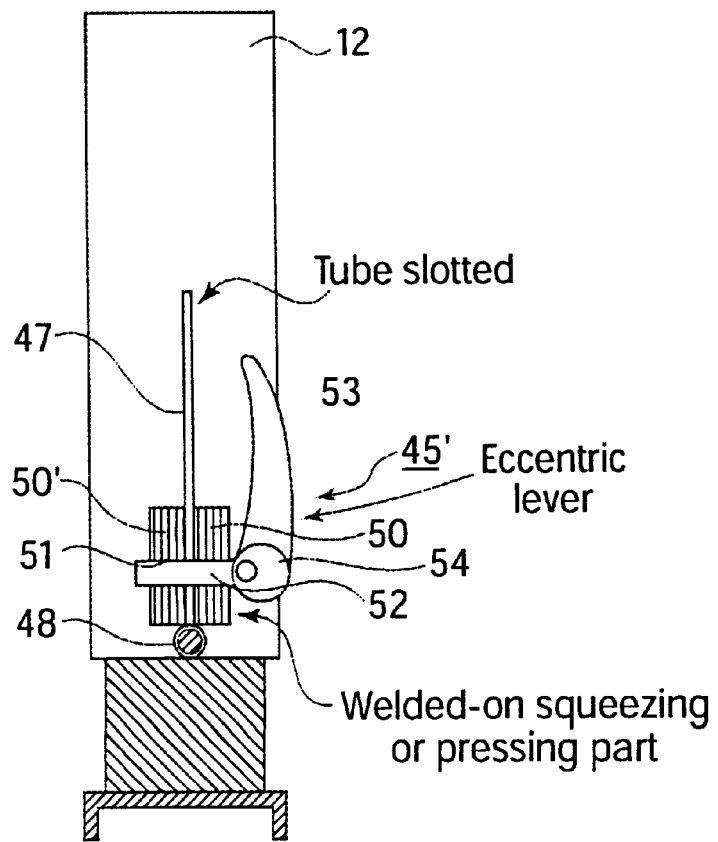
FIG. 8 shows the side elevation relating to FIG. 7, by a partly sectional view.

In the exemplified embodiment according to FIGS. 7 to 9, too, a cylindrical base socket 39' is secured on one end of the spreading strut 23, said base socket being in an upright position when said spreading strut is installed. The lower end of the vertical tube 12 of the support construction h1 can be coupled with said base socket, and locked therein in the coupled state, and can be secured there against rotation. However, provision is additionally made here for a vertical adjustment of the vertical tube 12. In detail, the plug-in openings 46' are provided in the wall of the base socket 39', said openings being spaced from one another at different levels. At its bottom end, the vertical tube 12 is provided with a slot 47, the latter ending in an open-edged plug-through opening 48 for receiving the plug bolt 49 or pin, whereby for changing the level of height of the table plate, the vertical tube 12 can be pushed with its lower end onto the base socket 39' more or less far in accordance with the spacing of the plug-in openings 46', and secured at the respective level by plugging the plug bolt 49 through the plug-through opening 48 into one of the plug-in openings 46'. The clamping jaws 50, 50' are secured on both sides of the slot 47 on the outer circumference of the vertical tube 12 and provided with a passage bore 51 extending tangentially to the tube through the two clamping jaws 50, 50', said through-bore 51 being smooth in the one clamping jaw 50 and provided with an inside thread in the other clamping jaw 50'. A clamping screw 52 can be inserted in the through-bore 51 from the one clamping jaw 50 and then screwed into the other clamping jaw 50'. Again, an eccentric-lever clamping device 45' is associated with the head of the clamping screw 52, so that when the eccentric lever 53 is cocked, it is possible to reduce the width of the slot 47, or to reduce the tube diameter in the axial zone of the slot 47, thereby pressing the flanks of the through-plug opening 48 against the shaft of an inserted plug bolt 49. For the sake of simplification, FIGS. 7 to 9 do not show a support rosette; however, it is understood that the eccentric cylinder 54 supports itself on such a rosette, and with its eccentric pin—which penetrates an oblong hole (not visible) in the head of the clamping screw 52—thereby more or less tightens the clamping screw 52 depending on the position of the clamping screw 52. In FIG. 8, the lever 53 is in a position in which the clamping screw or the tie rod is relieved (released position). When the lever 53 is pivoted clockwise, the clamping screw 52 would be tightened and the coupling locked. The base socket 39' is made of, for example a solid material, in particular of aluminum.

Figure 10:
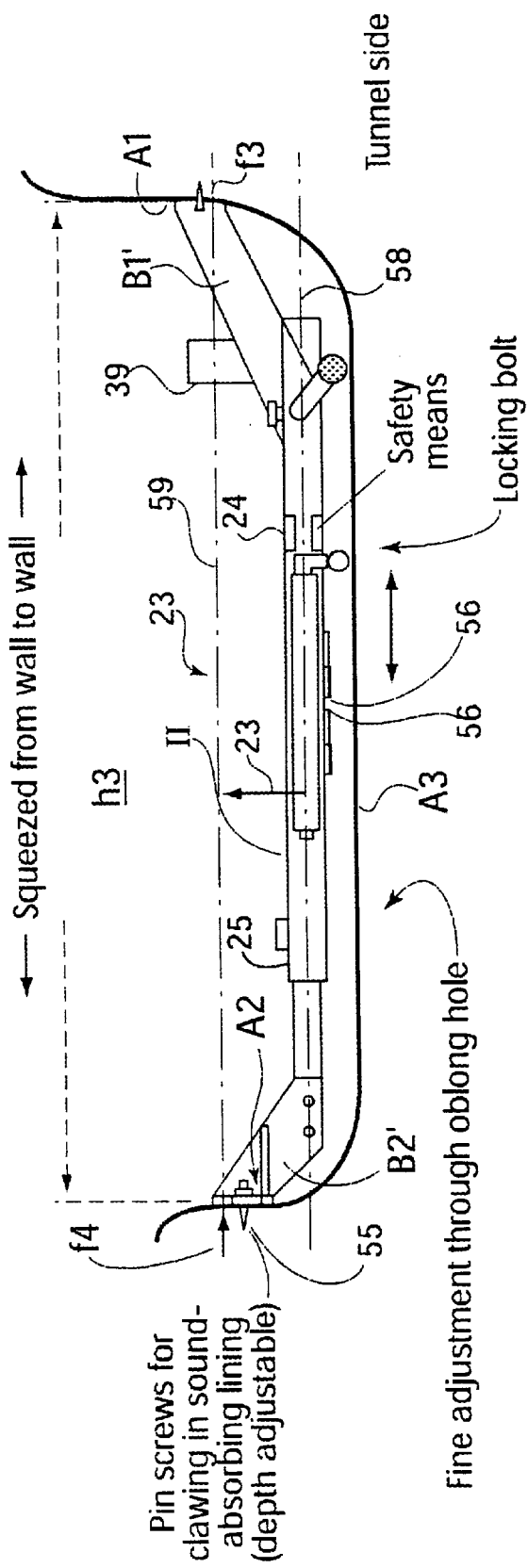
FIG. 10 shows an elevation of an embodiment slightly modified compared to FIGS. 2 to 5, with thickly drawn out contours of the floor tub for illustrating the force relations.

The spreading system h3 according to FIGS. 10 and 11 basically corresponds with the one according to FIGS. 1 to 5, the only difference being the shape of the contact-pressure elements B1' and B2'. However, like the contact-pressure elements B1 and B2, also the elements B1' and B2' are provided with outwardly protruding claw elements in the form of the pointed pins 55, for the purpose of slip-proof anchoring in the lining of the support surfaces A1, A2, the latter being formed by the sound-absorbing coverings and/or carpeting. The depth of penetration of the claw elements or pointed pins is preferably adjustable. FIGS. 1 to 5 as well as FIGS. 10 and 11 show that provision is made for at least two claw elements 55 per contact-pressure element B1, B2, said claw elements being horizontally spaced from each other. Said claw elements are adaptable to the contour of support surfaces A1, A2 extending slanted relative to a longitudinal reference axis, by adjusting the protruding pins to different lengths, and/or by setting the counter support surfaces B10, B20 or the associated contact-pressure elements B1, B2 to slanted positions.

In the exemplified embodiment according to FIGS. 10 and 11, the hinged joint between the two spreading levers 24, 25 is formed by a hinge 56, and provision is made on each narrow side of the spreading lever 23 for the lock bars 57a, 57b for locking in the stretched position II.

Furthermore, in the two FIGS. 10 and 11, the floor tub A3 with the cardan shaft tunnel wall A1 and the door sill A2 are represented by thick black lines. FIG. 10 shows how the spreading system h3 is automatically secured against bending back or folding open from its installed stretched position II into position I according to FIG. 2. For this purpose, the longitudinal axis 58 of the spreading strut 23 is placed at a lower level when said strut is in its installed position, clamped between the support surfaces A1, A2, for example displaced by the distance a3, i.e, shifted to a lower position than the connecting line 59 of the counter support forces f3, f4 acting on the contact-pressure elements B1', B2', so that said contact-pressure elements B1' and B2' are capable of exerting a torque onto the spreading levers 24, 25 in the sense of stretching or in the sense of an overstretched position shortly before said levers assume or while they assume their stretched position II, whereby the lever arm for the torque is supplied by the spacing of the hinged joint point 26' relative to the connection line 59 of the reactive forces.

Since the reactive forces f4', f3' are not fully aligned with each other in FIG. 10, the connecting line 59 is only an approximate or mean line. In spite of such self-securing, at least one of the locking means 57a, 57b is required so that undesirable unfolding is avoided even if an installed vertical tube 12 (FIG. 1) is more or less forcefully bent outwardly by unintentionally kicking it, or by an unauthorized person.

FIG. 11 shows that when the spreading strut 23 is in the installed position II, the spreading system h3 is unfolding a stability triangle with the corner zones A, B and C, which provides very good safety against slippage in the presence of shocks.

LIST OF REFERENCE SYMBOLS:

HE1 Holding device;
h1 Support construction;
h2 Table top plate;
h3 Fastening system;
A1 Support surfaces, on tunnel side;
A2 Support surfaces, on door sill side;
A3 Floor region;
1 Side stop, fixed;
2 Side stop, movable;
3 Fixed stops;
4 Power pack;
5 Writing paper clip;
6 Recesses for holding spectacles;
7 Handle recess;
8 Small plate;
9 Tubular socket;
10 Swivel joint;
11 Bearing element;
12 Vertical tube;
13 Swivel arm;
14 Swivel joint, second;
12' Axis of (12);
15 Bearing element, second;
16, 17 O-rings;
18 Pressure plate;
19 Tie rod;
20 Eccentric-lever clamping device;
21, 22 Nut and lock nut;
23 Spreading strut;
24, 25 Spreading lever;
26 Hinged joint;
26' Jointed axle;
B1, B2 Contact-pressure elements on (24,25);
B10,B20 Counter support surfaces;
I Ready position of (23);
II Extended position of (23);
24a Lever extension;
27 Means for detachable connection;
24b Flank of (24a);
28 Knurled screw;
29 Deepening or recess;
25b Side wall of (25);
30 Oblong hole guide;
31 Pivot;
32 Spring elements;
33 Stroke of (31);
34 Clearance of 3 to 5 mm;
31' Axle position, first;
31" Axle position, second;
34 Block;
35 Guide bars;
36a Block;
36b Block component;

25c Telescopic rail;
37 Row of holes;
38 Step screw;
39 Base socket;
40 Plug extension;
41 Edge slot;
42 Wall passage bore;
43 Clamping bolt;
44 Preset nut;
45 Eccentric-lever clamping device;
45a Support rosette;
46 Passage opening;
39' Base socket, additional;
46' Plug openings;
47 Slot;
48 Plug-through opening;
49 Plug bolt;
50, 50' Clamping jaws;
51 Passage bore;
52 Clamping screw;
45' Eccentric-lever clamping device;
54 Eccentric cylinder;
B1', B2' Contact-pressure elements, additional;
55 Pointed pins or claw elements;
56 Hinge;
57a, 57b Lock bars;
58 Longitudinal axis of (23);
A3 Distance;
59 Connection line;
f3,f4 Counter support forces;
26' Hinged joint;
60 Stability triangle;
A,B,C Corners of (60).

What is claimed is:

1. An adjustable holding device (HE1) for on-board computers in motor vehicles, comprising:
a support construction (h1) with a table top plate (h2) at a top end of said support construction for demountably and remountably holding the on-board computer in an interior of the motor vehicle in a working position with respect to a vehicle occupant operating the on-board computer;
a fastening system (h3) at a lower end of the support construction (h1) for scouring the support construction on support surfaces (A1, A2) in or near a floor region (A3) of the interior of the motor vehicle, said fastening system (h3) comprising a clamping system with at least one clamping strut adapted for clamping on the support surfaces (A1, A2) of the motor vehicle interior and extending at least approximately perpendicular to the floor of the vehicle when installed and opposing each other with a spacing; said clamping strut having two ends and having on each of its two ends a contact pressure element (B1, B2), said contact-pressure elements being provided with outer counter support surfaces (B10, B20) for pressingly abutting the support surfaces (A1, A2) when installed, wherein the clamping system (h3) is provided with means for increasing spacing between the contact-pressure elements (B1, B2) relative to one another during installation of said clamping system, such increase in spacing generating contact pressure force, or for reducing the spacing between the contact-pressure elements during removal of the clamping system (h3), such reduction in spacing reducing the force of contact pressure;
wherein the clamping system is a spreading system and the clamping strut is a spreading strut (23) having at least two spreading levers (24, 25) connected by a lockable and releasable hinged joint (26), wherein at least one of said spreading levers (25) can be pre-adjusted with respect to length so that in a bent ready-position (I), the spreading strut (23) can be positioned with its contact-pressure elements (B1, B2) spaced from the support surfaces (A1, A2), and the spreading strut (23) can be stretched by means of depressing the hinged joint (26), to a length generating a contact pressure force (f3, f4), wherein a stretched and installed position (II) of the expanding strut (23) can be arrested by locking the hinged joint (26).

2. The holding device according to claim 1, wherein the spreading system (h3) with its contact-pressure elements (B1, B2) is adapted to be clamped between the support surfaces (A2) in a region of a door sill, on one side, and the support surfaces (A1) in a region of a cardan tunnel on another side.

3. The holding device according to claim 2, wherein the spreading system (h3) is designed for demountable and remountable fastening in a region of a foot space located in front of a front passenger seat.

4. The holding device according to claim 3, further comprising a device for anchoring the support construction (h1) on the foot side, said device being secured in an end zone of the spreading strut (23) or corresponding spreading lever (24) facing a driver's seat.

5. The holding device according to claim 1, wherein the spreading system (h3) is adapted to be installed with a small spacing from and plane-parallel with the vehicle floor, as well as with a vertical expanse of only a few centimeters of its expanding strut (23).

6. The holding device according to claim 1, wherein a longitudinal axis of the spreading strut (23) is placed lower in a clamped position (II) between the support surfaces than a line of connection between reactive support forces (f4', f3') acting on the contact-pressure elements for self-securing the spreading levers (24, 25) against unfolding from their stretched position (II), so that the contact-pressure elements (B1, B2) can exert onto the spreading levers (24, 25) an expanding torque shortly before said levers have reached an expanded position (II) or while in the expanded position, wherein the lever arm for the torque is provided by a spacing between the hinged joint and a line of connection of the reactive support forces (f4', f3').

7. The holding device according to claim 1, wherein the contact-pressure elements (B1, B2) are provided with projecting claw elements at their counter support surfaces (B10, B20), for slip-proof anchoring on a lining of support surfaces formed by sound-absorbing covers or carpeting.

8. The holding device according to claim 7, wherein the claw elements are designed in the form of pointed pins.

9. The holding device according to claim 8, wherein each contact-pressure element (B1, B2) has at least two claw elements, said claw elements being adaptable to a contour of the support surfaces (A1, A2) extending slanted relative to a horizontal longitudinal reference axis, by adjusting the pointed pins to different lengths of protrusion or by setting the counter support surfaces (B10, B20) or the associated contact-pressure elements (B1, B2) to slanted positions.

10. The holding device according to claim 7, wherein the claw elements have adjustable depth penetration.

11. The holding device according to claim 1, further comprising a base socket (39, 39') secured on the spreading strut or spreading lever, said base socket standing upright when the spreading system (h3) is in a mounted position, wherein a lower end of a vertical tube (12) of the support construction (h1) can be coupled via the base socket by means of a plug connection, and locked in a coupled state against rotation and removal.

12. The holding device according to claim 11, wherein the vertical tube (12) has a lower end which is plugged into said base socket (39) in a manner secured against rotation, and fixed in its inserted position by at least one transverse bolt (43).

13. The holding device according to claim 12, wherein a tapering, hollow-cylindrical plug extension (40) is secured in the lower end of the vertical tube (12), said extension being pluggable into the base socket (39); wherein an upper end of the base socket (39) is provided with an edge slot (41) extending parallel with the axis of the socket; and wherein an inner end of a radial clamping bolt (43) with a preset nut (44) is supported in a wall through-bore (42) of the plug extension (40), said clamping bolt fitting into the edge slot (41) of the base socket (39) When the plug extension (40) is plugged in; and wherein an eccentric-lever clamping device (45) is associated with a head of the clamping bolt (43), said clamping device being lockable for arresting the vertical tube (12) inserted with its plug extension (40), and releasable for removing the vertical tube from its plug seat.

14. The holding device according to claim 13, wherein a wall part of the plug extension (40) opposing the clamping bolt (43) is provided with a passage bore (46) permitting access to the preset nut (44) for screwing tools.

15. The holding device according to claim 11, further comprising:
(a) Plug-in openings (46') spaced from each other at different levels of height in the wall of the base socket (39');
(b) a slot (47) ending in an open-edged plug-through opening (48) for a plug bolt (49) or pin in a lower end of the vertical tube, wherein the vertical tube (12) can be pushed with its lower end more or less far onto the base socket (39') in accordance with the spacing of the plug-in openings (46') for changing a height of the table plate, and secured at the selected level by inserting the plug bolt (49) through the plug-through opening (48) into one of the plug-in openings (46);
(c) clamping jaws (50, 50') secured on both sides of the slot (47) on an outer circumference of the vertical tube (12), and provided with a passage bore (51) extending tangentially with the tube through both clamping jaws (50,50'), said passage bore being smooth in the one clamping jaw (50) and provided with an inside thread in the other clamping jaw (50');
(d) A clamping screw (52) inserted in the passage bore (51) from the one clamping jaw (50) and screwed into the other clamping jaw (50'); and an eccentric-lever, clamping device (45') associated with a head of the clamping screw (52), so that when the eccentric lever (53) is cocked, a width of the slot (47) or the tube diameter can be reduced in an axial zone of the slot (47), causing flanks of the plug-through opening (48) to be pressed against a shaft of an inserted plug bolt (49).

16. The holding device according to claim 15, wherein the base socket (39') consists of solid material.

17. The holding device according to claim 1, wherein one of the spreading levers (25) consists of two rail pieces (24a, 24b) telescopically displaceable against each other for pre-adjusting length, wherein one of said rail pieces has a row of holes (37) oriented in a longitudinal direction, and a cross bolt element (38) is supported in the other rail piece for locking insertion in one hole of said row of holes (37), such hole being selectable for achieving a desired spacing.

18. The holding device according to claim 1, wherein for tolerance compensation and for limiting the clamping forces, at least one of the two spreading levers (24, 25) is designed yielding with spring-elasticity in a longitudinal direction.

19. The holding device according to claim 18, wherein the hinged joint (26) of the two spreading levers (24, 25) is designed in the form of a pivot joint with an oblong-hole guidance (30) of a pivot (31) of the one spreading lever (25) in side walls of the other spreading lever (24), wherein during expansion of the spreading strut (23), the pivot (31) is movable in the oblong hole (30) against a force of spring elements (32) inserted between the two spreading levers (24, 25), and due to the force of the spring elements (32) being tensioned in said process, forces of contact pressure acting between the contact-pressure elements (B1, B2) and their support surfaces (A1, A2) are limited, and lengths tolerances of the expanding strut (23) are compensated.

20. The holding device according to claim 1, wherein a first of the two spreading levers (24, 25) is provided with a lever extension extending beyond the hinged joint (26), a length of such extension corresponding with a substantial part of a length of the second spreading lever (25); wherein in a stretched position (II) of the expanding strut (23), the first spreading lever (24) with its lever extension (24a) abuts and is aligned with the second spreading lever (25); and further comprising means (27) for detachably mechanically connecting an end zone of the lever extension (24a) with the second spreading lever (25), said means forming a lock for arresting the hinged joint (26).

21. The holding device according to claim 20, wherein in the stretched position (II) of the spreading strut, the lever extension grips over the second spreading lever; and wherein a knurled screw (28) is supported in a flank (24b) of the lever extension (24a), said knurled screw, in said stretched position, being screwable into a deepening or recess (29) of a side wall (25b) of the second spreading lever (25) located beneath the flank (24b).

* * * * *